R. W. HOOD.
GAME OF SKILL.
APPLICATION FILED MAY 11, 1920.
1,430,903.
Patented Oct. 3, 1922.
10 SHEETS—SHEET 1.
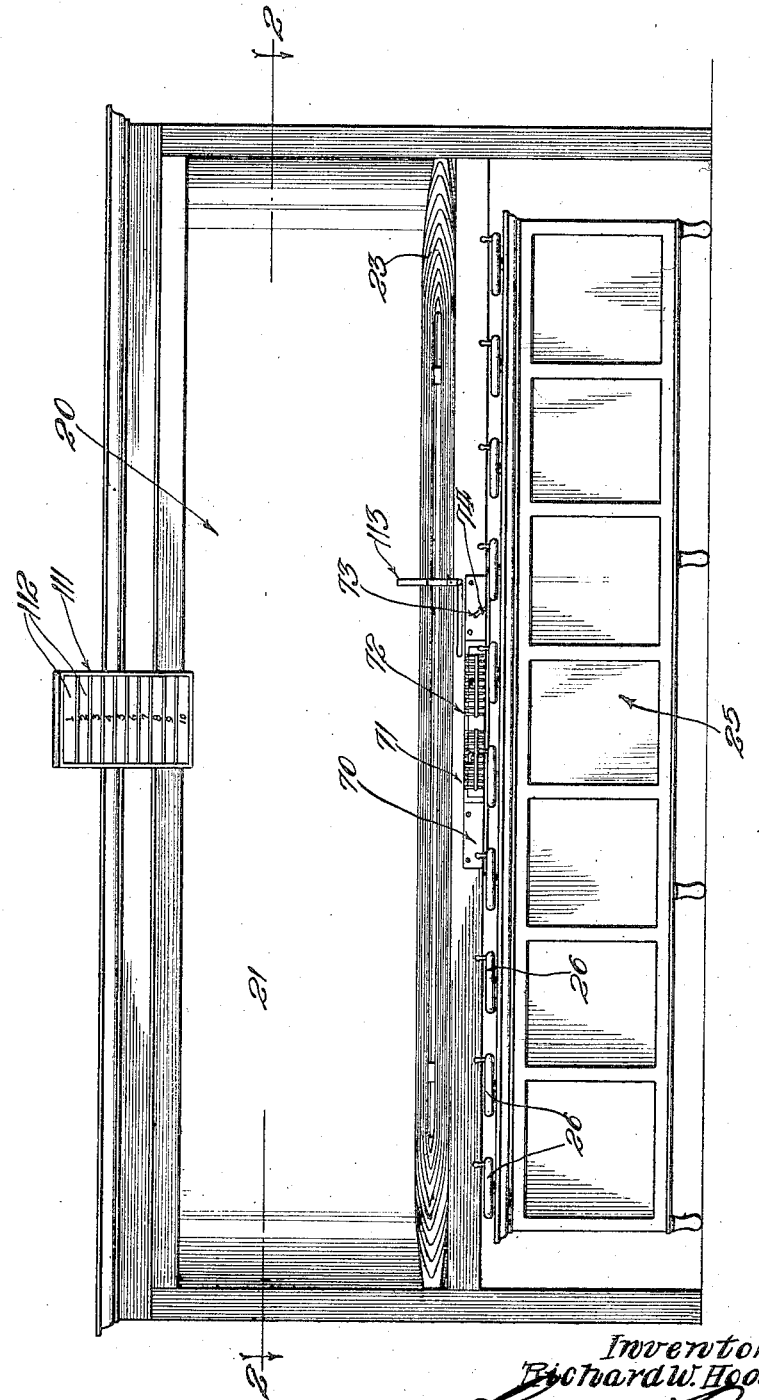
Inventor:
Richard W. Hood.
Attys.

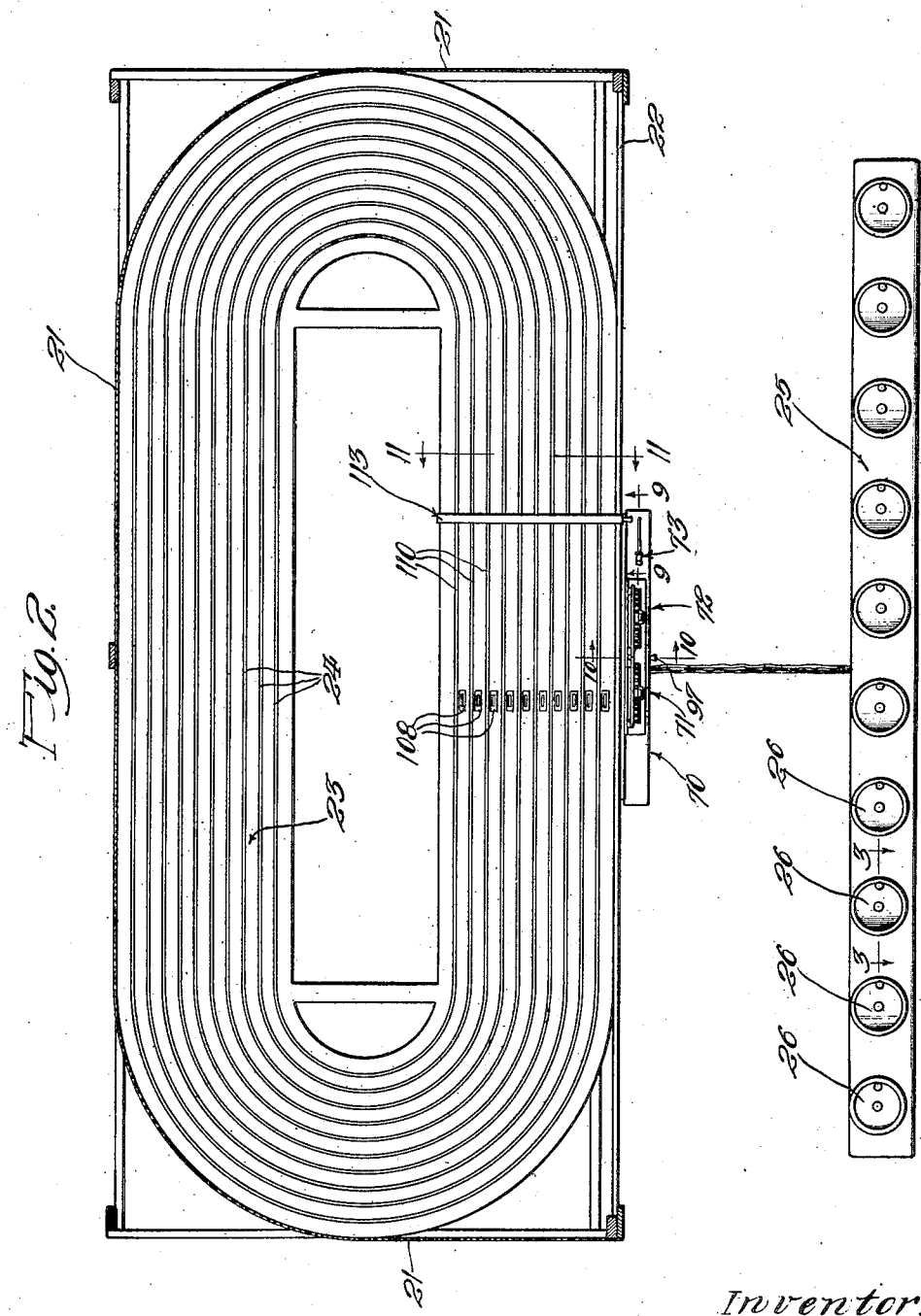

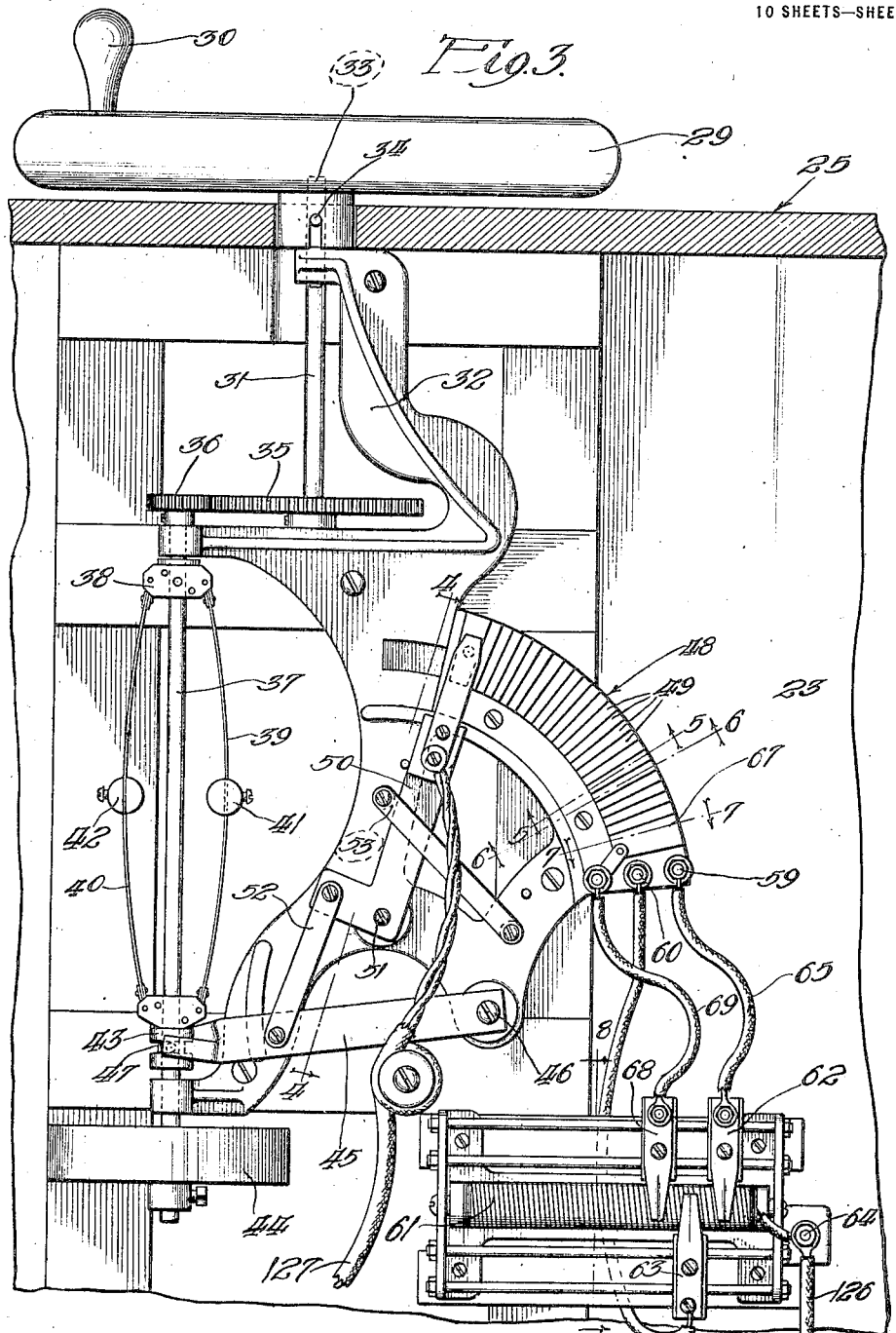

R. W. HOOD.
GAME OF SKILL.
APPLICATION FILED MAY 11, 1920.
1,430,903.
Patented Oct. 3, 1922.
10 SHEETS—SHEET 4.
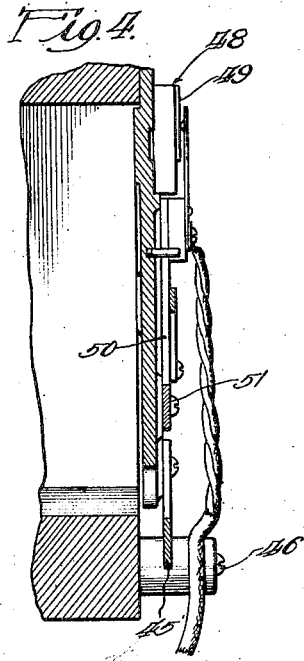
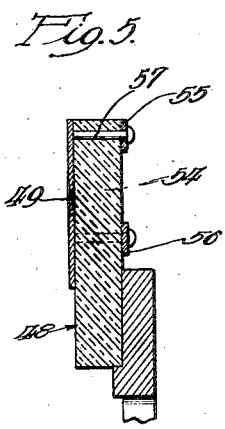
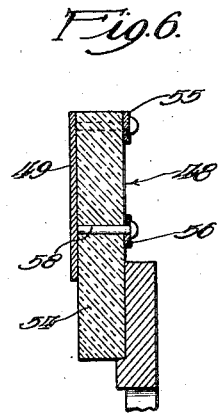
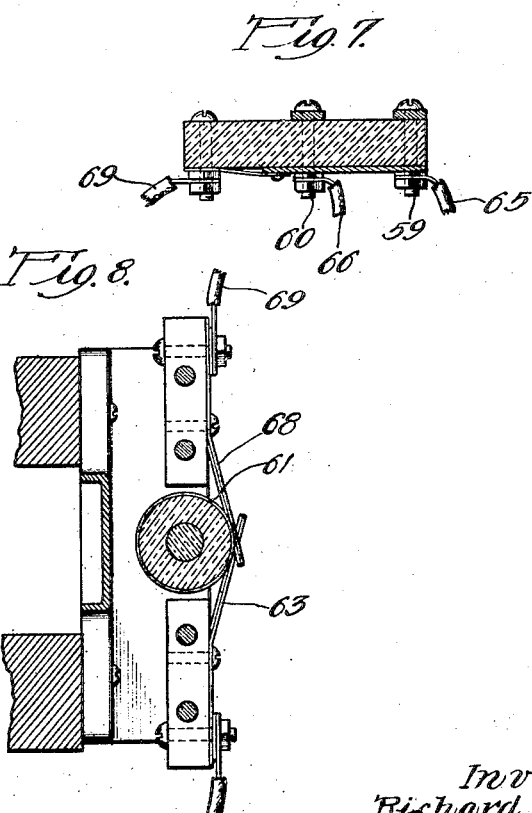
Inventor:
Richard W. Hood.

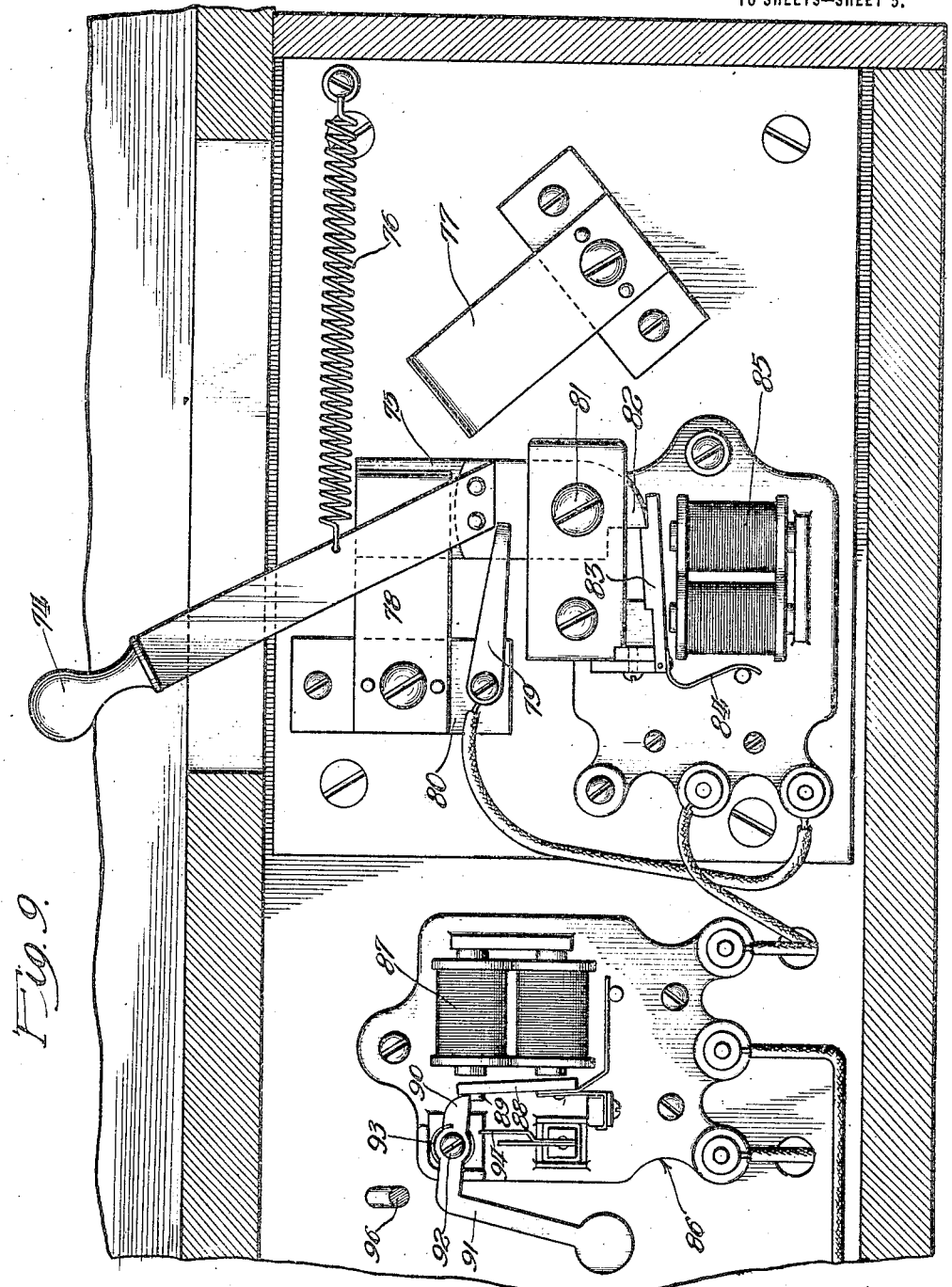

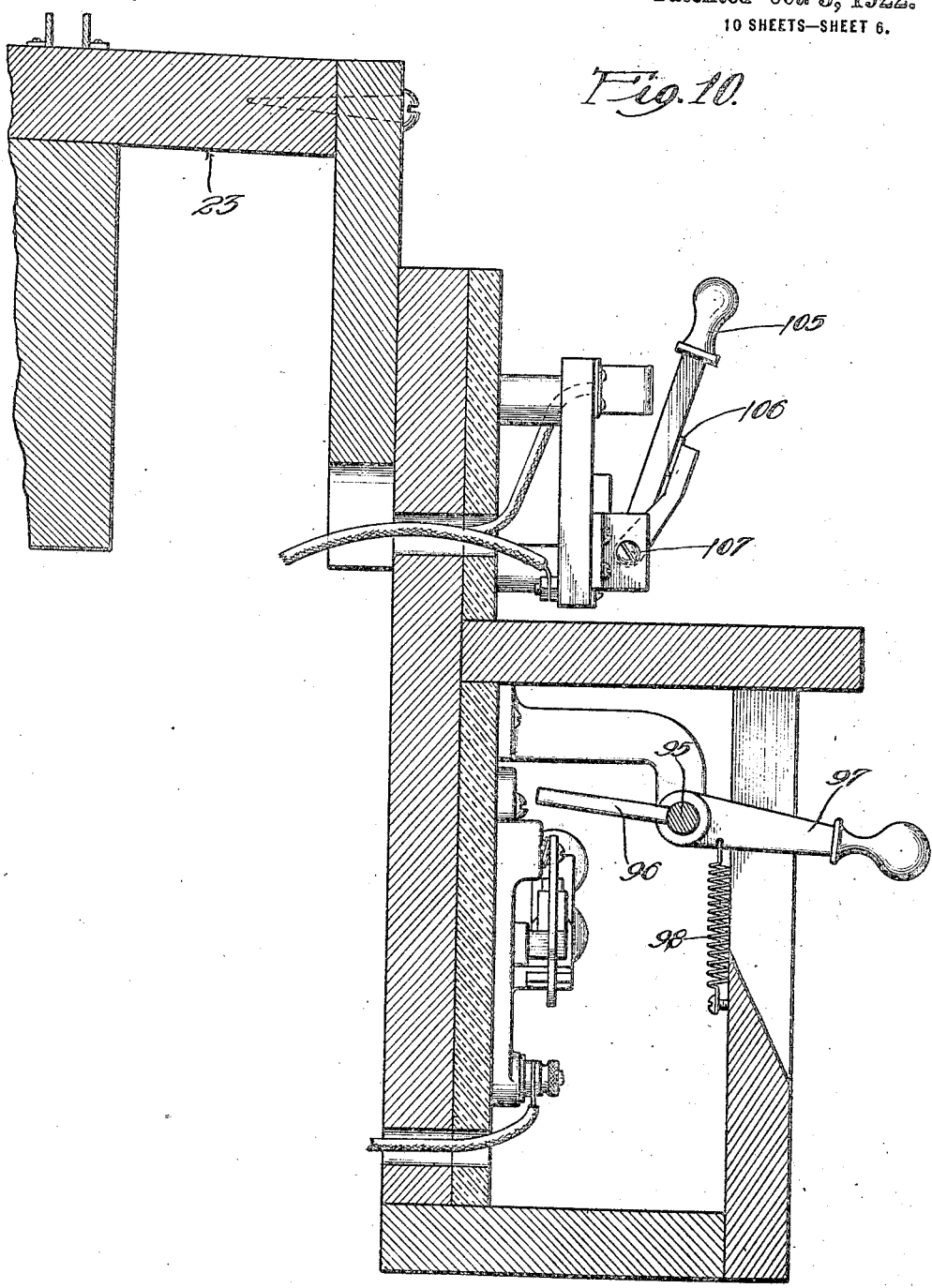

R. W. HOOD.
GAME OF SKILL.
APPLICATION FILED MAY 11, 1920.
1,430,903.  Patented Oct. 3, 1922.
10 SHEETS—SHEET 7.
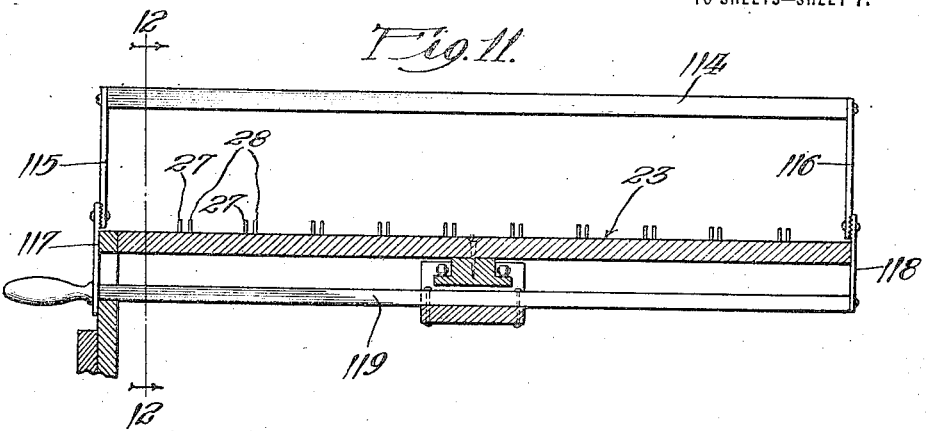
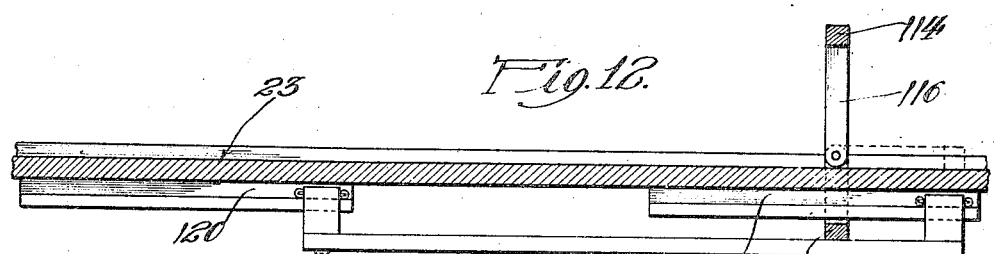
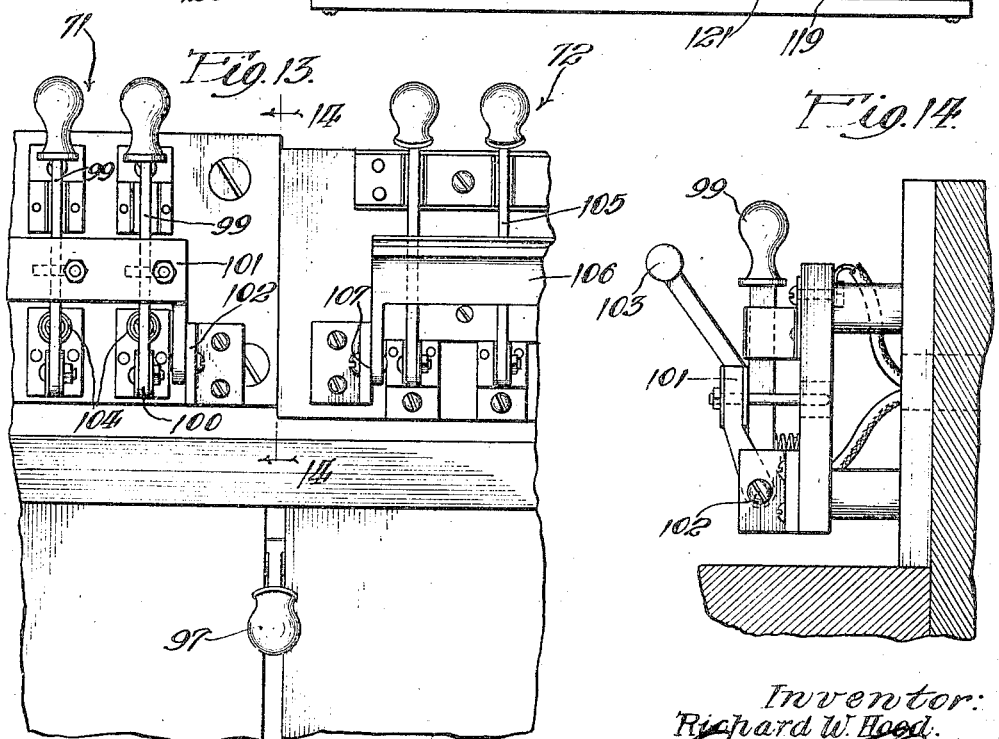
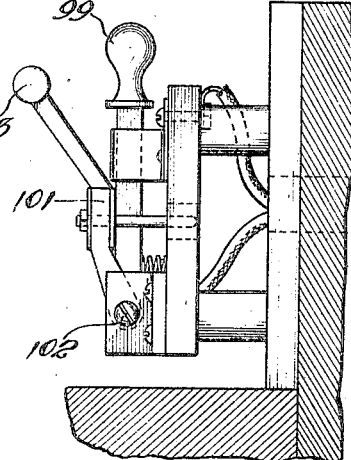
Inventor:
Richard W. Hood

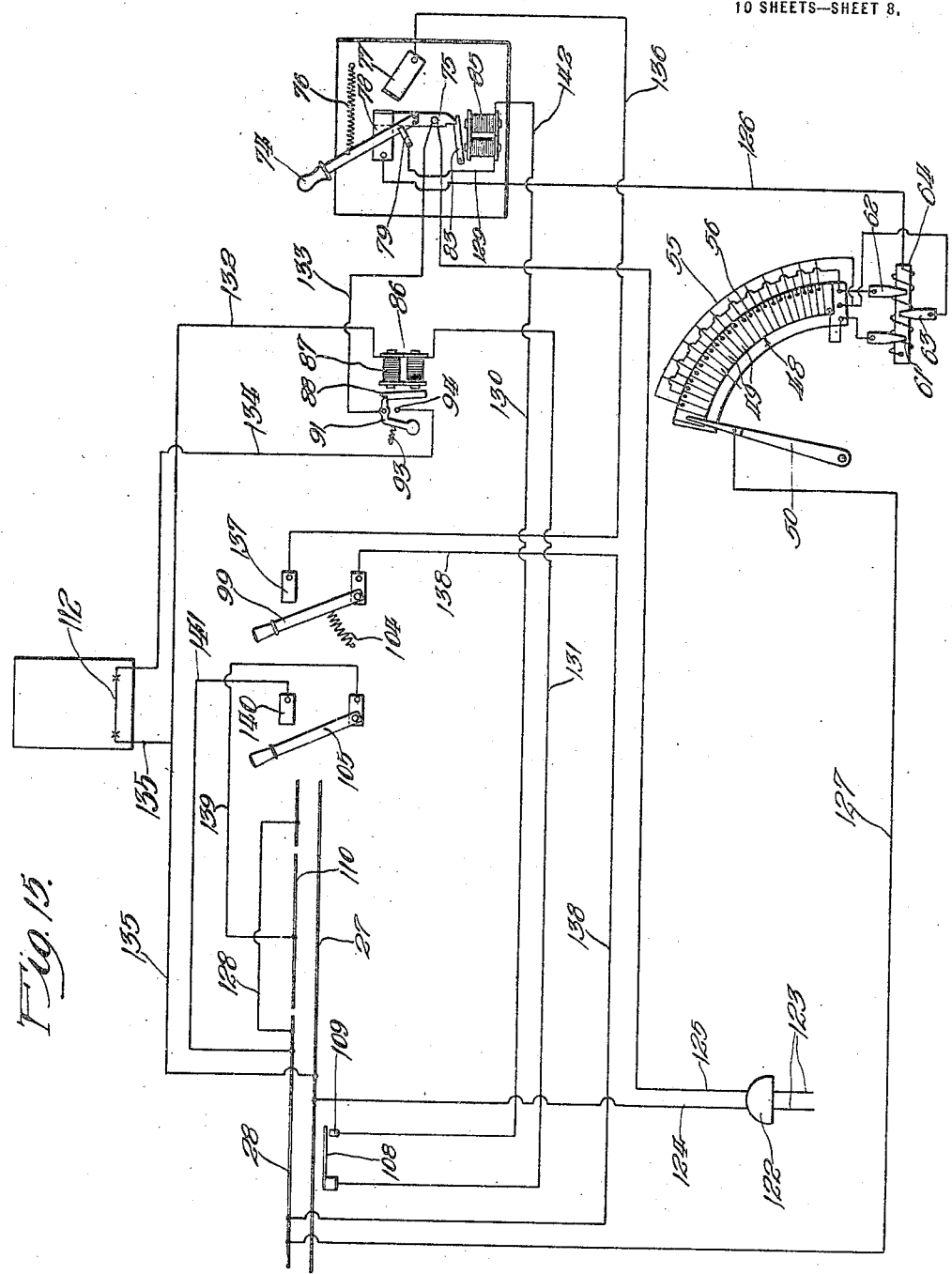

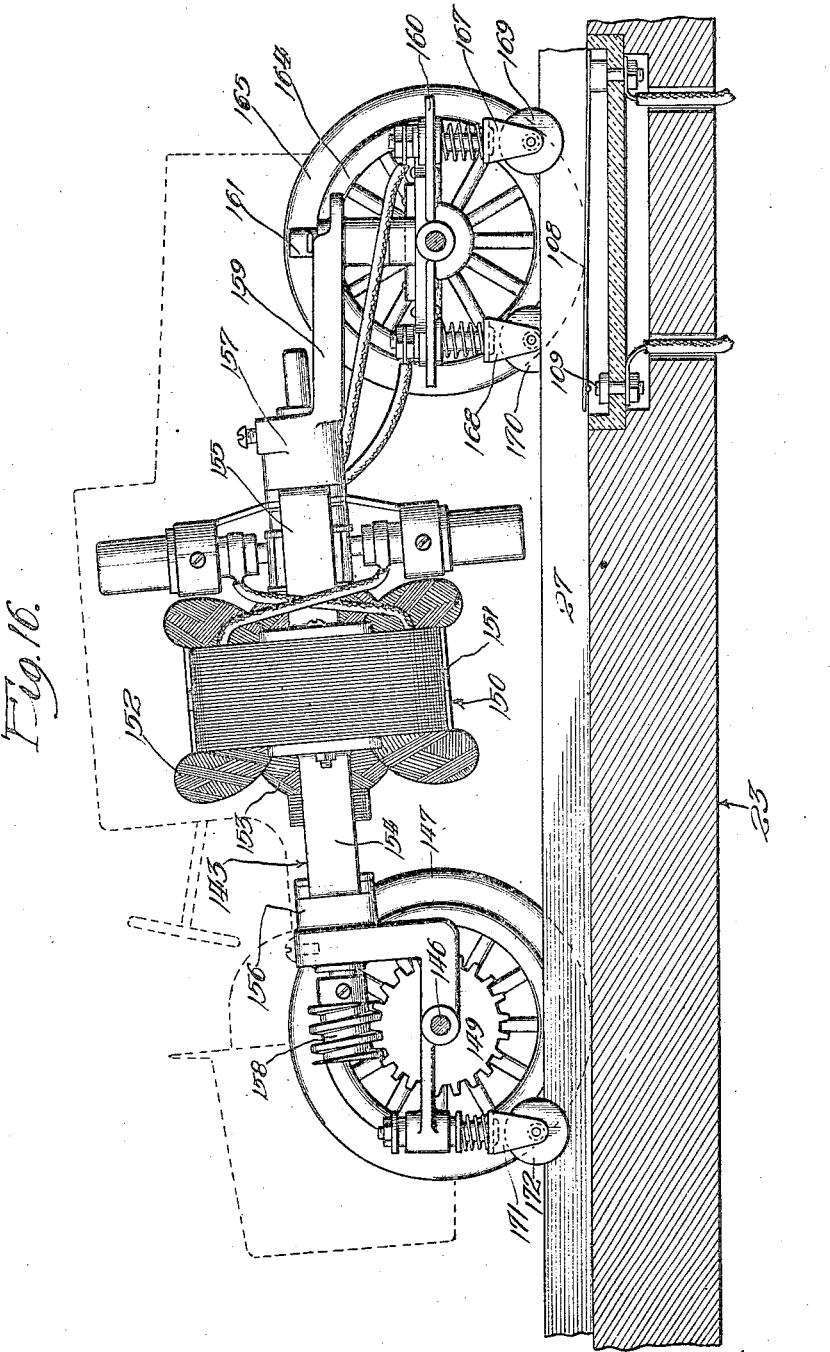

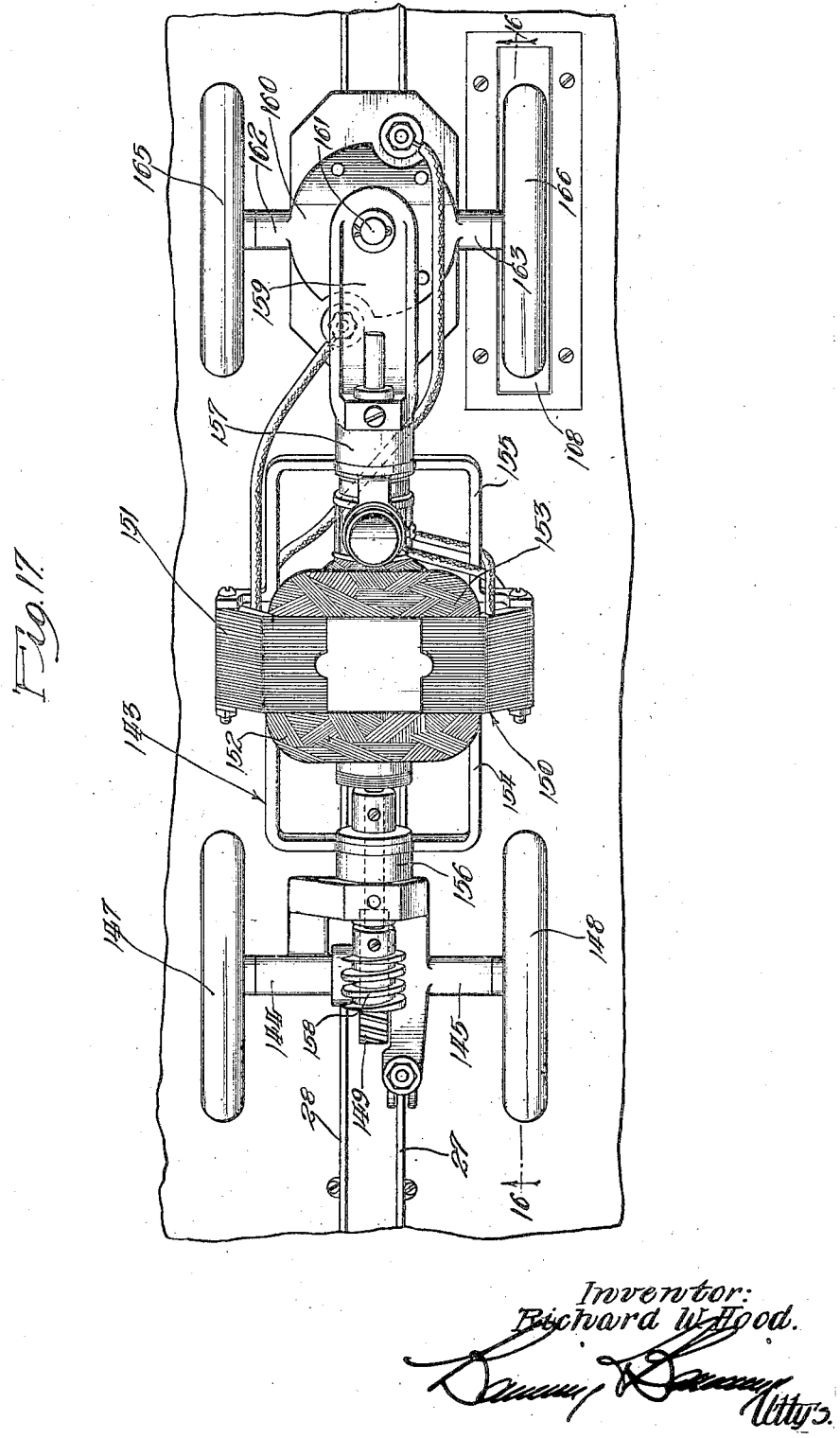

Patented Oct. 3, 1922.

1,430,903

UNITED STATES PATENT OFFICE.

RICHARD W. HOOD, OF CHICAGO, ILLINOIS.

GAME OF SKILL.

Application filed May 11, 1920. Serial No. 380,453.

*To all whom it may concern:*

Be it known that I, RICHARD W. HOOD, a citizen of the United States, residing at Chicago, county of Cook, and State of Illinois, have invented certain new and useful Improvements in Games of Skill, of which the following is a specification.

The present invention has to do with certain improvements in games of skill and the like. The game of skill herein disclosed is one in which a number of cars or vehicles, such as automobiles, are intended for operation around a trackway in such manner that they can be raced or competed one against the other. More particularly in this connection, the invention relates to certain improvements in machines of this class in which the cars or automobiles are operated around closed trackways, although certain features of the invention are not limited to this particular application.

More particularly also the features of the invention have to do with a machine so designed and constructed as to be operable and controllable electrically as distinguished from constructions in which the improvements of the individual units are occasioned mechanically.

One of the features of the invention has to do with the provision of an arrangement in which any suitable number of cars or units, as, for example 10, may be used, each being under the control or operation of an individual driver. In conjunction with the individual control of these various cars or units, there is a common indicating means or the like for making automatic announcement of the winning unit, so that in cases of close competition the automatic record is made and displayed of the winning unit.

Another feature of the invention has to do with the provision of automatic means under the control of the operator for initially positioning all of the cars or units at the starting line. Another feature has to do with the provision of suitable arrangements whereby when all of the competitors are ready with their respective cars or units at the starting line, current may be simultaneously supplied to all of the competing cars or units under the control of their respective competitors, so that a perfect start will be ensured, thereby eliminating the possibility, either accidentally or otherwise, of starting any one of the cars or units away from the starting line in advance of the others.

Other features of the invention relate to the construction of the cars or units themselves and the manner in which current is supplied directly to them during their travel. In this connection another feature of the invention has reference to the manner in which the cars or units are steered as they take the curves of the track, while at the same time ensuring a perfect supply of current to each car at all times.

Another feature of the invention has reference to the construction of the controlling devices whereby the current is supplied to each car individually under the control of the particular driver or competitor. In this connection, one of the objects is to provide a simple arrangement whereby the operation of all of the cars or units are preliminarily adjusted so as to compensate for the unequal lengths of the inner and outer tracks, so that in the normal operation of all of the cars or units, they will each complete a lap in the same space of time.

Other objects and uses of the invention will appear from a detailed description of the same which consists in the features of construction and combinations of parts hereinafter described and claimed.

In the drawings:

Figure 1 shows a front elevation of a completely assembled machine embodying the features of the present invention, the cars or units, however, not being in position on their respective tracks;

Fig. 2 shows a plan view corresponding to Fig. 1, being in effect a section taken on line 2—2 of Fig. 1, looking in the direction of the arrows;

Fig. 3 shows a face view of one of the controlling devices for one of the cars or units, the same being in the normal or idle position;

Fig. 4 shows a detail section taken on line 4—4 of Fig. 3, looking in the direction of the arrows;

Fig. 5 shows a detail section taken on line 5—5 of Fig. 3, looking in the direction of the arrows;

Fig. 6 shows a detail section taken on the line 6—6 of Fig. 3, looking in the direction of the arrows;

Fig. 7 shows a detail section taken on the line 7—7 of Fig. 3, looking in the direction of the arrows;

Fig. 8 shows a detail section of the rheostat being taken on the line 8—8 of Fig. 3, looking in the direction of the arrows;

Fig. 9 shows a fragmentary face view of the cut-out box, illustrating the cut-out switch and one of the control relays for one of the tracks, being a section taken on line 9—9 of Fig. 2, looking in the direction of the arrows;

Fig. 10 shows a cross section through the control box of Fig. 9, being also a section taken on line 10—10 of Fig. 2, looking in the direction of the arrows;

Fig. 11 shows an enlarged detail section taken on the line 11—11 of Fig. 2, looking in the direction of the arrows, and illustrating particularly the construction of the stop member for lining up the cars at the starting line;

Fig. 12 shows a section taken on the line 12—12 of Fig. 11, looking in the direction of the arrows;

Fig. 13 shows a fragmentary face view of the central portion of the control switch block;

Fig. 14 shows a detail section taken on the line 14—14 of Fig. 13, looking in the direction of the arrows;

Fig. 15 shows a typical wiring diagram for the controlling switches and relays for a single one of the units;

Fig. 16 shows a typical vertical elevation of a simple type of unit or car for operation on one of the trackways of the present invention, the front wheel of the car standing at the position for engagement with the cut-out switch; and Fig. 17 shows a plan view corresponding to Fig. 16.

Before proceeding to describe the construction of the unit or car and the various control switches and circuits in detail, I will first explain briefly the assembling arrangement illustrated in Figs. 1 and 2. In the construction therein shown, there is provided a cabinet or housing generally designated in its entirety by the numeral 20 wherein, as a matter of convenience, the tracks, cars or units are located. This cabinet or housing is conveniently closed in at the sides and back by means of a metal sheet 21 as clearly illustrated in Fig. 2, the front face 22 ordinarily being left open for exposure of the cars and tracks. The various track-ways are conveniently mounted upon a table or platform 23, which may be conveniently tilted or slanted upwardly toward the rear, so that the various tracks 24 may be more readily seen from the front.

This cabinet arrangement presents the further advantage of arrangement in this that by placing lamps or lights in the upper portion of the cabinet, they may be caused to illuminate all portions of the trackways in a brilliant manner without causing any direct glare or illumination to reach the eyes of the observers.

As a matter of convenience also a control table or cabinet 25 may be located in front of the open side of the cabinet 20, and on the table 25 there is provided a series of controllers each designated by the numeral 26, which controllers correspond in number with the various trackways 24. It is thus possible for a group of competitors corresponding in number to the number of trackways and controllers to simultaneously operate their various controllers, and, through the mechanism and arrangements presently to be described, to thereby control their respective cars as they travel around the course.

Each of the trackways 24 may be built up in any convenient manner, but ordinarily it should include two or more electrical conductors, so that electric current for the car or unit may be delivered to and from the car. As a simple matter of convenience also, each of these trackways comprises a pair of upstanding flanges 27 and 28, as shown particularly in Figs. 11 and 17, which flanges are electrically insulated from each other, and serve as the electrical conductors, while at the same time serving to guide their respective cars in their travel.

I will state at this point that each car or unit carries an electrical motor, generally of the series type, the terminals of which are connected to suitable brushes or contactors which travel on the flanges aforesaid, the motor of each car being drivingly connected with the wheels of the car, so that upon energizing the rails or flanges the motor will be operated, and the car will be driven along the track at whatever speed it is determined by the amount of current supplied to the rails.

Each of the controllers 26 may be of any suitable construction, but the particular construction illustrated in detail in Figs. 3 to 8 inclusive is such that in order to maintain a supply of current to any particular car or unit, it is necessary to keep rotating the controller; and is also such that the quantity of current delivered to each unit or car is determined by the speed at which the controller is momentarily driven. The arrangement may be such that the delivery of current to the unit is dependent upon the speed of rotation of the controller in any suitable ratio, or in any suitable manner, so that the competitor has it within his power to regulate or vary the delivery of current to his particular unit or car simply by way of varying the speeds at which he rotates the handle of his particular controller. Nevertheless it is possible to so arrange and construct the mechanism, and such an arrangement is illustrated in the present case that the increase in speed of the controller handle does not necessarily result in an increased delivery of current, thus introducing an element of skill into the operation of the machine, since in such case it is essential that the competitor should select the exact speed of rotation of his controller handle which will ensure the maximum delivery of current to the unit.

In proceeding to describe the controller and various associated or related elements in detail, it will be understood that this is done by way of illustration, since ordinarily in any particular installation there will be provided two or more controllers and the accompanying switch mechanism of more or less identical or at any rate similar construction.

In the particular construction illustrated in Figs. 3 to 8 inclusive, there is provided a circular disk-shaped handle 29 having a grip 30 by means of which it may be readily rotated or spun. The disk member 29 is mounted upon the upper end of a vertical shaft 31, which shaft is journaled in a suitable frame 32. The upper end 33 of said shaft will ordinarily project a slight distance above the table 25; and as a matter of convenience the disk member 29 may be removably mounted upon said upper end 33, so that when it is desired to remove any particular unit from service, it is only necessary to lift the disk 29 off of the shaft 31. A pin and slot arrangement 34 serves as a convenient means for effecting a driving connection to the shaft 31 when the disk is set into place.

A gear 35 on the lower end of the shaft 31 drives a pinion 36 on the upper end of the centrifugal governor shaft 37, so that the speed of said shaft 37 is thereby multiplied. This centrifugal governor shaft carries at its upper end a block 38 into which are pivoted the upper portions of the springs or bows 39 and 40 which in turn are provided with the weights 41 and 42 which will develop a centrifugal tendency as the shaft 37 rotates. This centrifugal tendency will tend to raise a sleeve 43 which is slidably mounted upon the lower portion of the shaft 37, and to which the lower ends of the bows 39 and 40 are pivotally connected.

A fly wheel 44 is illustrated on the lower end of the shaft 37 in order to ensure a smoother operation of the machine, although the presence of this element is largely a matter of discretion with the designer.

A lever arm 45 has its outer end pivoted to a stationary part at the point 46. The outer end of the lever arm is bifurcated and the bifurcations engage a slot 47 in the sleeve 43, so that the lever 45 is rocked up and down, and will assume at any instant a position dependent upon the speed of rotation of the controller.

At a suitable point there is provided an arcuate contact member 48 having a number of individual contact blocks 49. An arm 50 is pivoted to a stationary part at the point 51, and said arm 50 will be swung on said pivot by reason of a link connection 52 joining the arm to the lever 45. A no-speed stop 53 may be provided for limiting the backward movement of the arm to the initial position illustrated in Fig. 3.

As previously suggested, the various contact blocks 49 which are variously engaged by the contact lever 50, or a contact carried thereby, may be connected in any suitable manner largely according to the desires of the designer. In the particular arrangement illustrated, these contact blocks 49 are shown as being successively connected to two different points of the rheostat, so that as the lever arm 50 is rocked farther and farther by reason of constantly increasing speed of the shaft 37, the contact arm will successively engage high speed and low speed contact blocks. That is to say, in the arrangement illustrated, the current supplied to the car or unit does not necessarily increase in quantity as the speed of the controller is increased, but on the contrary the volume of current delivered to the car or unit will fluctuate according to whether the contact arm momentarily will engage one or the other of the series of blocks.

In order to bring about the arrangement just explained, I have mounted the blocks 49 on a common insulating base 54 of arcuate form, and on the back side of said base I have provided a pair of conduct plates 55 and 56 respectively. The plate 55 connects to alternate ones of the blocks 49 by pins 57, and the plate 56 connects to the intermediate blocks 49 by pins 58. The two plates 55 and 56 are connected to the terminal posts 59 and 60 respectively in Fig. 3.

At a suitable point there is provided a rheostat coil 61 adjacent to which are the movable contact fingers 62 and 63 which may be set back and forth in various positions so as to increase or decrease the amount of resistance between the terminal 64 of the rheostat and the contacts 62 and 63. These contacts in turn are connected to the terminals 59 and 60 by means of the wires 65 and 66.

In order to introduce an additional element of skill into the operation of the device, I have illustrated the end contact 67 of the series 49 as being individually connected to another contact 68 of the rheostat by means of a wire 69. This special contact 68 may be located at a still different point on the rheostat and preferably at a still greater distance from the terminal 64 of the rheostat, so that when the controller is operating at maximum speed, the greatest amount of resistance will actually be cut into the circuit.

It will be evident that, with the above described arrangement, the resistance cut into and out of the circuit will depend upon the particular rheostat contact momentarily engaged by the movable contact finger, and inasmuch as these contacts are connected up for successively higher and lower resistances, and inasmuch as the contact bars 49 are relatively narrow, it is extremely difficult for the competitor to drive the controller at the exact speed which will correspond to the minimum resistance of rheostat in the circuit. Moreover, the natural tendency will be for the competitor to drive his controller at the maximum speed, on the assumption that this will ensure the delivery of a maximum volume of current, but on the contrary this will actually reduce the volume of current in those cases in which the terminal contact 67 is connected into the rheostat at a relatively higher resistance point than any of the other contact bars.

The current as controlled by each competitor is delivered to the corresponding car or motor. I have provided means whereby the winning car may open the circuit which supplies current to all of the competing cars with a simultaneous announcement of the name or number of the winner. I will state at this point that I have also provided suitable switches and related parts for lining up the various cars at the starting line under the control of the operator who is directing the competition. All of these means I will now describe in detail.

At a convenient point as, for example, on the front of the table or stand which carries the tracks, and behind the stand 25, is located a cabinet designated in its entirety by the numeral 70. On the front face of this cabinet is located a group of switches 71, and another group of switches 72, each of said groups including a number of switches equal to the number of tracks on the table, and each switch of each group corresponds to a particular track. The switches 71 are used in lining up the cars at the starting line, and the switches 72 are used for starting the cars at the beginning of the competition. These switches may be operated either individually or as a gang.

In addition to these gangs of switches there is a circuit breaker designated in its entirety by the numeral 73, the handle 74 of which is conveniently located with respect to the positions of the gang switches.

The construction of the circuit breaker itself is clearly shown in Fig. 9. It includes a blade 75 connected to the handle 74, which blade 75 is normally drawn to the right under the influence of a spring 76. When drawn to the right, it engages a stationary clip 77, whereas when held in the left-hand position, it engages two clips 78 and 79, both of which are located on an insulating base or block 80. The blade is pivoted at the point 81. On its lower end it has a finger 82 which may be normally engaged by an armature 83 under the influence of a spring 84, such armature having a shoulder whereby when the handle 74 is thrown to the left, the blade 75 will be locked in engagement with the clips 78 and 79. As soon as the solenoids 85 are sufficiently energized, the armature 84 will be drawn down, and the finger 82 disengaged to allow the blade 75 to move over into contact with the clip 77, and simultaneously disengage from the clips 78 and 79.

At a suitable point, and ordinarily within the cabinet 70, is located a relay 86 corresponding to each of the competitive tracks and cars. Each of these relays has a solenoid 87 adapted to operate on an armature 88 when sufficiently energized. The armature in turn is provided with a stop 89 which normally stands in position to engage a finger 90 on a bell crank 91 which is pivoted at the point 92. A spring 93 tends to draw the bell crank towards the left, but such movement is normally resisted by the engagement of the finger 90 with the stop 89 until the solenoid 87 is sufficiently energized. Thereupon the bell crank will be drawn to the left under the influence of the spring 93 tending to carry the finger 90 into engagement with a contact point 94 whereupon a circuit will be closed to energize the solenoid 85 of the circuit breaker and immediately cause the blade 75 and handle 74 to assume the reverse position.

It will thus be evident that the energizing of any one of the relays 86 will bring about the operation of the circuit breaker in the above manner.

In order to restore all of the relays to their normal position, there is provided a rock shaft 95 within the cabinet, which rock shaft has a finger 96 corresponding to each relay and in position to engage the corresponding bell crank arm so as to tilt the same when the shaft is rocked and thereby restore all of the relays to their normal position which is illustrated in Fig. 9.

A handle 97 which is connected to the rock shaft 95 reaches to a convenient point where it may be manipulated by the operator. A spring 98 is provided for normally holding the rock shaft in the unoperated position.

Each of the switches of the gang 71 includes a blade 99 pivoted to a common block at the point 100. A bar 101 of insulating material lies behind the blades 99 and has its end portions pivoted to the stand, as shown at 102 in Fig. 13. A handle 103 is connected to the bar 101 so as to facilitate operating it in order to momentarily engage all of the blades 99 with their respective clips. A spring 104 is provided behind each of the blades 99 tending to force the same away from the clips to open the circuit. Consequently the blades 99 will only stand in closed position momentarily while held there by the operator.

The gang 72 is provided with a switch blade 105 corresponding to each track or competitive car. A bar 106 of insulating material is located behind the blades 105, the ends of said bar 106 being pivoted to the cabinet as at 107. Upon momentarily throwing the block 106 upward, all of the switch blades 105 will be moved into closed position.

At the terminal point of each trackway is located a spring contact 108 adjacent to one of the rails on which the car travels, so that when the car reaches the terminal point one of its wheels in riding over this spring contact will momentarily close the circuit with the stationary contact point 109. The detailed construction of these parts is best shown in Figs. 16 and 17, in which the front wheel of the motor car stands in operating position on the spring contact 108. These spring contacts are connected with the respective rails 86 so that as the first car passes the terminal or finished line, its rail will be momentarily energized, thereby tripping the circuit breaker.

Just beyond the finished line there is located an isolated section of rail 110, the rail on both sides being energized independently thereof. These isolated sections 110 are located at the starting line, and it is, therefore, evident that the cars cannot start until said sections are energized. These sections are independently connected to the switch blades 105 under the control of the gang bar 106. With this arrangement, it will be evident that if all of the cars stand at the starting line and on their respective isolated sections 110, they will all start simultaneously if all of said sections be simultaneously energized.

At a convenient point for observation by the competitors, and generally on the upper portion of the cabinet 20, is located an announcer 111 which has a series of windows 112 corresponding to the individual tracks and motors. These windows are transparent, and electric light bulbs are located behind them, which bulbs when illuminated display the winning number. The individual bulbs in this announcer are connected into the individual relay circuits in such a way that simultaneously with the tripping of any given relay, the current will be passed through the corresponding lamp.

In order to exactly line up all of the cars preparatory to a start, there is provided a line-up device which I will now describe in detail. This includes a bar 114 which spans all of the tracks, its ends being supported by the arms 115 and 116, as shown in detail in Figs. 11 and 12. The ends of these arms 115 and 116 are pivoted to the upper ends of a pair of blocks 117 and 118 respectively, which blocks in turn are connected to a carriage 119 which may be shifted back and forth with respect to the table 23 in the trackways 120 and 121.

The bar 114 normally stands in the raised position shown by full lines in Fig. 12, wherein it is sufficiently elevated to permit the motors or cars to freely pass beneath. On the other hand, it may be turned down in the dotted line position of Fig. 12, wherein it will engage the front wheels of the various cars. When so engaged, the carriage 119 may be moved backwardly as permitted by the tracks 120 and 121 so as to line up the cars. Thereupon the bar 114 may be again raised to the full line position so as to permit the cars to pass beneath it when their motors are energized.

Reference may be now had to Fig. 15 in which is illustrated a typical layout of circuits for controlling the supply of current to the tracks for a single car. In this case there is provided a transformer 122 adapted to take the primary current as from an electric light circuit over the wires 123. The secondary wires are designated by the numerals 124 and 125. One of the rails 27 is directly energized by the secondary lead 124, but the other secondary lead 125 passes directly to the circuit breaker switch blade 75 which is, therefore, normally energized. The clips 78 of the circuit breaker connect to the rheostat terminal 64 by means of a lead 126. The lead movable contact of the rheostat connects to the front rail 28 by a lead 127. This rail 28 has its various portions connected together by the leads 128, if necessary, in order to span the isolated section 110.

The clip 79 of the circuit breaker connects to one side of its solenoid 85 by means of a lead 129, and the other side of the solenoid 85 connects to the contact 109 by the lead 130. The spring contact 108 connects to one terminal of the solenoid 87 of the corresponding rail 86 by means of a lead 131, and the other end of said solenoid connects by a lead 132 with the other side of the transformer secondary, being the transformer terminal 124, as by connecting said lead 132 to the rail 27.

The bell crank 91 of the corresponding rail connects to one side of the primary circuit, being the line 125, as by means of a lead 133 which connects into the circuit breaker blade 75. The relay contact 94 connects to the corresponding announcer lamp as by means of a lead 134; and the other side of said announcer lamp connects by a lead 135 with the other side of the transformer secondary, as by connecting said lead 135 with the rail 27. It is thus evident that as soon as the solenoid 87 is sufficiently energized to trip the bell crank 91, the circuit will be established through the corresponding announcer lamp.

The clip 77 of the circuit breaker connects by a lead 136 with the upper clip 137 of the corresponding switch blade 99, which switch blade connects by a lead 138 with the rail 28. Consequently when the circuit breaker is tripped so as to swing its blade 75 to the right, with simultaneous disconnection from the clips 78 and 79 and simultaneous connection with the clip 77, it will be possible to energize the rail 28 through the switch 99, but owing to the fact that the switch 99 tends to open under the influence of its spring 104, this energizing of the rail 28 will only continue as long as the switch is held in closed position. This is for the purpose of making it possible to restore the car to the initial or starting point by a temporary application of current under the control of the operator.

The isolated rail section 110 connects to the corresponding switch blade 105 by means of a lead 139, and the corresponding clip 140 connects to the corresponding rail 28 by means of a lead 141. Therefore, the closing of the switch 105 will energize the isolated section 110 so as to make it possible to start the car which is standing thereon.

The operation of the arrangements above described will now be readily apparent. Assuming that the cars are standing at various points on their respective tracks, each car may be individually returned to the starting line by temporarily closing its switch 99 so as to feed current to its rail 28 independently of any operation of the competitor's rheostat. This can only be done, however, by first placing the circuit breaker in the open position so as to energize the clips 77 thereof. Each car may be individually restored to the starting line in the above manner, or all of the cars may be thus restored as a group by the use of the gang bar of the switches 99. In this connection, the bridge piece 114 should also be placed in the lower position so as to align up the cars.

Having lined up all of the cars and raised the bridge piece, the competition may begin. The circuit breaker is first thrown into the left-hand position so as to energize the clips 78 and 79 and de-energize the clips 77. Assuming that the various competitors are all engaged in the act of turning the respective rheostat controller handles, the operator will simultaneously throw all of the switches 105 in the closed position which may be done by the use of the gang bar 106. This will immediately energize all of the isolated sections 110 on which the cars are standing, and all of the cars will start off under the control of their respective competitors.

The first car to reach its spring contact 108 will momentarily energize its relay solenoid 87, thereby tripping its bell crank 91. The same current which thus flows through the solenoid 87 to trip the relay will simultaneously flow through the solenoid 85 of the circuit breaker so as to cause the circuit breaker to be tripped, thus shutting off the further supply of current to all of the cars which will then come to rest at their various positions around the course.

The momentary energizing of the solenoid 87 will cause the corresponding bell crank 91 to be tripped so as to complete the circuit through the announcer lamp which will continue to burn until the rails are again restored to normal position as by the operation of the handle 97.

It will be observed that with the arrangement thus far described, the first car to complete a single lap will open the circuit breaker and stop the rest. In case it should be desired to run for more than a single lap, a switch may be placed in the lead 130, at 142 which switch may be initially opened, and may be closed after the completion of one or more laps by the leading car. Thereupon the circuit breaker will be opened the next time any car passes over its spring contact 108.

Referring to Figs. 16 and 17, I have therein illustrated a simple construction of car which I have found by experience to be very well adapted to the needs of the present game. Said car includes a frame 143 having a pair of sidewise projecting bearings 144 and 145 in its rear end, through which is passed a pin 146 to the ends of which are secured the rear wheels 147 and 148. A worm gear 149 is secured to the middle portion of the pin 146.

The central part of the frame is bifurcated to provide a convenient location for the driving motor 150. Said motor comprises a laminated field section 151 with suitable windings 152 to generate consequent pulls at the sides of the field, and an armature 153 extending axially through the field member. A very convenient type of construction is that illustrated in which the bifurcated portion of the frame 143 comprises a pair of U-shaped frame members 154 and 155 which are secured to the laminated field 151 and have in their central portions the bearings 156 and 157. The motor shaft works in these bearings and projects rearwardly a sufficient distance beyond the worm 158 which engages the worm gear 149.

To the front frame member 155 is swiveled another frame member 159 so that it can rock about a longitudinal axis. An axle plate 160 is pivoted to the frame member 159 on the vertical axis 161; and said axle plate has a pair of sidewise extending bearings 162 and 163 through which are passed the front axle 164. The front wheels 165 and 166 are mounted on the ends of said axle. With this construction it will be evident that the front axle may rock about a vertical axis for the steering function and may also rock about a longitudinal axis so as to take care of warped surface conditions such as may exist in rounding the banked ends of a raised course.

A pair of downwardly extending guide fingers 167 and 168 are carried by the plate 160. These bearing fingers carry at their lower ends the grooved wheels 169 and 170 which travel on the rails 27 and 28 respectively, and owing to the fact that the wheels 169 and 170 are located one in advance of the axle 164, and one to the rear of said axle, said grooved wheels serve as a very convenient means for turning the plate 160 so as to compel the car to turn the curves at the ends of the course. At the same time these wheels 169 and 170 may also serve as current collecting devices for which purpose the pins 167 and 168 are respectively insulated from the plate 160. A similar pin 171 may be located at the rear of the car, the same having a grooved wheel 172 adapted to travel on one of the rails so as to serve in keeping the rear end of the car properly aligned at all times.

While I have herein shown and described only a single embodiment of the features of my invention, still I do not limit myself to the same except as I may do so in the claims.

I claim:

1 A game of skill comprising in combination a series of tracks of electrically conducting material, a motor adapted to travel around each track, a movable line-up device spanning all of the tracks at the starting point and movable at the option of the operator to a position sufficiently elevated to permit the motors to pass beneath, an electrically isolated section of track adjacent to said line-up device, an electric competitor's controller corresponding to each track, each of said controllers including a series of contact blocks, a rheostat coil, connections from successive contact blocks to alternate points of the rheostat coil, a rotatable driving handle, a contact movable over the contact blocks, and a centrifugal connection between the driving handle and movable contact, a circuit breaker including a tripping solenoid, a spring contact finger adjacent to each track, a relay corresponding to each track including a contact finger, means for moving said contact finger into closed circuit position when the solenoid of the relay is energized, an announcer including an electric lamp corresponding to each track, an electric circuit including each of said lamps and the movable contact of the corresponding relay, an electric circuit including the spring contact and the solenoids of both the corresponding relay and the circuit breaker, a switch connection from each isolated track section to the corresponding rail of the corresponding track, and an electric circuit for each track including the corresponding controller and the movable contact of the circuit breaker, substantially as described.

2. A game of skill comprising in combination a series of tracks of electrically conducting material, a motor adapted to travel around each track, an electrically isolated section of track adjacent to said line-up device, an electric competitor's controller corresponding to each track, each of said controllers including a series of contact blocks, a rheostat coil, connections from successive contact blocks to alternate points of the rheostat coil, a rotatable driving handle, a contact movable over the contact blocks, and a centrifugal connection between the driving handle and movable contact, a circuit breaker including a tripping solenoid, a spring contact finger adjacent to each track, a relay corresponding to each track including a contact finger, means for moving said contact finger into closed circuit position when the solenoid of the relay is energized, an announcer including an electric lamp corresponding to each track, an electric circuit including each of said lamps and the movable contact of the corresponding relay, an electric circuit including the spring contact and the solenoids of both the corresponding relay and the circuit breaker, a switch connection from each isolated track section to the corresponding rail of the corresponding track, and an electric circuit for each track including the corresponding controller and the movable contact of the circuit breaker, substantially as described.

3. A game of skill comprising in combination a series of tracks of electrically conducting material, a motor adapted to travel around each track, an electric competitor's controller corresponding to each track, each of said controllers including a series of contact blocks, a rheostat coil, connections from successive contact blocks to alternate points of the rheostat coil, a rotatable driving handle, a contact movable over the contact blocks, and a centrifugal connection between the driving handle and movable contact, a circuit breaker including a tripping solenoid, a spring contact finger adjacent to each track, a relay corresponding to each track including a contact finger, means for moving said contact finger into closed circuit position when the solenoid of the relay is energized, an announcer including an electric lamp corresponding to each track, an electric circuit including each of said lamps and the movable contact of the corresponding relay, an electric circuit including the spring contact and the solenoids of both the corresponding relay and the circuit breaker, and an electric circuit for each track including the corresponding controller and the movable contact of the circuit breaker, substantially as described.

4. A game of skill comprising in combination a series of tracks of electrically conducting material, a motor adapted to travel around each track, an electric competitor's controller corresponding to each track, each of said controllers including a series of contact blocks, a rheostat coil, connections from successive contact blocks to selected points of the rheostat coil, a driving handle, a contact movable over the contact blocks, and a centrifugal connection between the driving handle and movable contact, a circuit breaker including a tripping solenoid, a contact finger adjacent to each track, a relay corresponding to each track including a contact finger, means for moving said contact finger into closed circuit position when the solenoid of the relay is energized, an announcer including an electric lamp corresponding to each track, an electric circuit including each said lamp and the movable contact of the corresponding relay, an electric circuit including the spring contact and the solenoids of both the corresponding relay and the circuit breaker, and an electric circuit for each track including the corresponding controller and the movable contact of the circuit breaker, substantially as described.

5. A game of skill comprising in combination a series of tracks of electrically conducting material, a motor adapted to travel around each track, an electric competitor's controller corresponding to each track, each of said controllers including a series of contact blocks, a rheostat coil, connections from successive contact blocks to selected points of the rheostat coil, a driving handle, a contact movable over the contact blocks, and a centrifugal connection between the driving handle and movable contact, a circuit breaker including a tripping solenoid, a contact finger adjacent to each track, an electric circuit including the spring contact and the solenoid of the corresponding circuit breaker, and an electric circuit for each track including the corresponding controller and the movable contact of the circuit breaker, substantially as described.

6. A game of skill comprising in combination a series of tracks of electrically conducting material, a motor adapted to travel around each track, an electric competitor's controller corresponding to each track, each of said controllers including a series of contact blocks, a rheostat coil, connections from successive contact blocks to selected points of the rheostat coil, a driving handle, a contact movable over the contact blocks, and a centrifugal connection between the driving handle and the movable contact, a circuit breaker including a tripping solenoid, a contact finger adjacent to each track, and means in conjunction with said finger, solenoid of the corresponding breaker, and corresponding controller, whereby the passage of a car over said track at the location of the finger opens the circuit, substantially as described.

7. A game of skill comprising in combination a series of tracks of electrically conducting material, a contact finger adjacent each track, a motor adapted to travel around each track, an electric announcer corresponding to each track, a master switch for all of the tracks, a competitor's controller corresponding to each track, and electric circuits in conjunction with said devices whereby the flow of current to each car is dependent upon the operation of the corresponding competitor's controller, and whereby the passage of the first car adjacent to its contact finger causes opening of the master switch and operation of its announcer, substantially as described.

RICHARD W. HOOD.